April 2, 1946.　　　J. STUART, 3D　　　2,397,632
AIRPLANE
Filed March 4, 1941　　　6 Sheets-Sheet 2

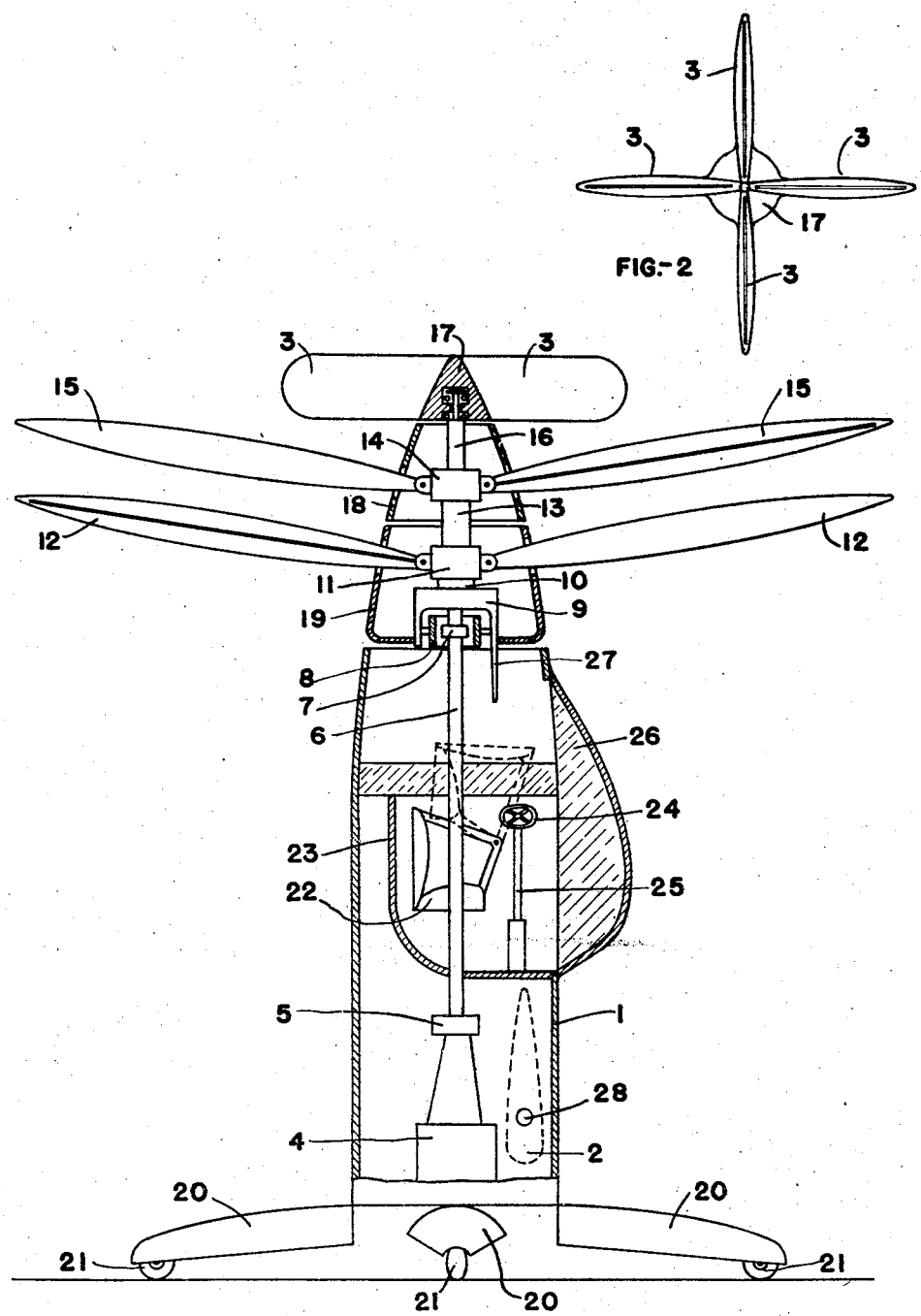

April 2, 1946.  J. STUART, 3D  2,397,632
AIRPLANE
Filed March 4, 1941  6 Sheets-Sheet 3

Joseph Stuart III INVENTOR.
BY Ernest M. Symmes
Attorney

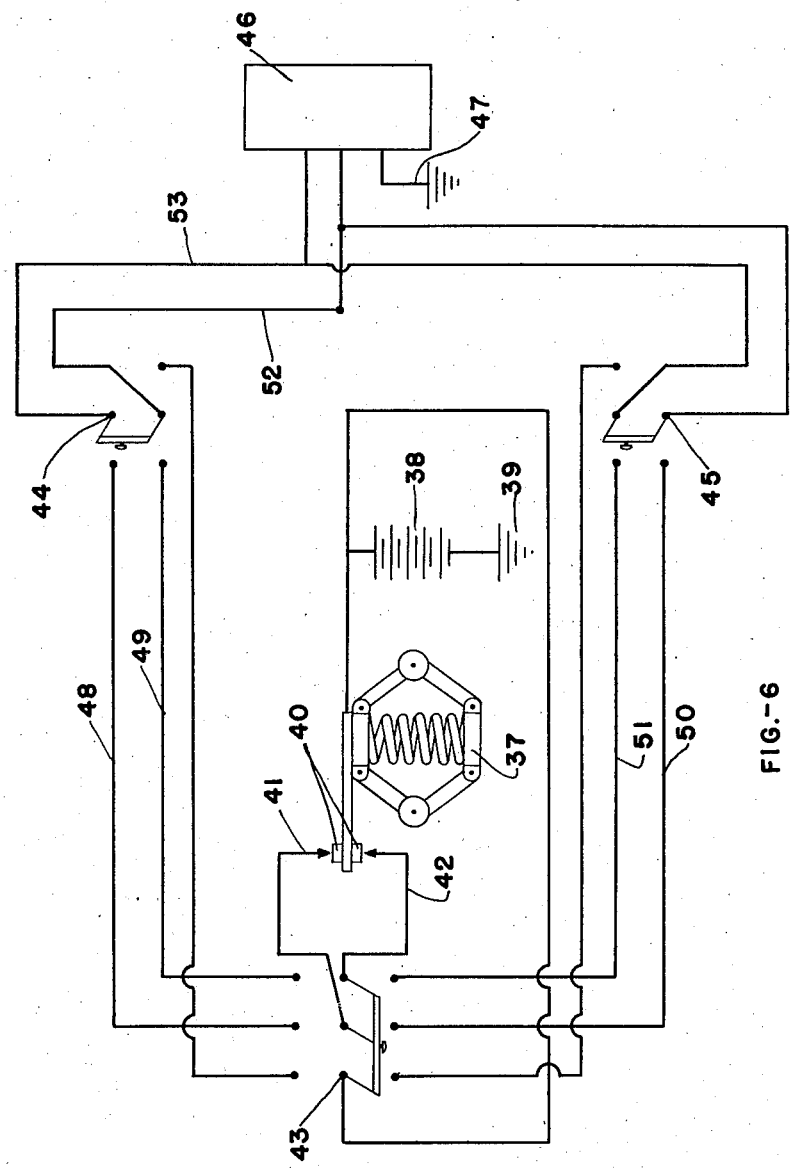

April 2, 1946.  J. STUART, 3D  2,397,632
AIRPLANE
Filed March 4, 1941  6 Sheets-Sheet 5

Joseph Stuart III INVENTOR.
BY Ernest M. Symmes
Attorney

Patented Apr. 2, 1946

2,397,632

UNITED STATES PATENT OFFICE 2,397,632

AIRPLANE

Joseph Stuart, III, Dayton, Ohio, assignor to General Motors Corporation, Detroit, Mich., a corporation of Delaware Application March 4, 1941, Serial No. 381,615

8 Claims. (Cl. 244—7)

This invention relates to aircraft, and more particularly to aircraft adapted to rise vertically and fly horizontally.

The main disadvantage of airplanes has been the high speeds necessary for landing, and the large, level ground area necessary for landing and take-off. Heretofore, attempts have been made to avoid this difficulty by the use of helicopter or autogiro types of aircraft, but the disadvantage has not been overcome to any appreciable extent.

The helicopter suffers from the great disadvantage of being supported solely by the propeller, thus causing very low efficiencies in horizontal flight at high speeds.

The autogiro also suffers from the disadvantage of very low efficiencies at high horizontal speeds, large and unwieldy rotor, and inability steadily to climb vertically or hover.

One of the objects of my invention is to provide an aircraft, not of the known helicopter or autogiro type, but one capable of ascending vertically from the ground, then operating and flying substantially as an ordinary airplane, and finally descending vertically.

Another object of my invention is the provision of improved means of control of my aircraft by means of tilting the propeller axis, in addition to wing tilt or other control.

Another object of my invention is the provision of a novel type of landing gear that retracts to form a streamline extension of one end of the aircraft body in level flight.

Another object of my invention is the provision of oppositely rotating propellers achieving control torques about the longitudinal axis of the body of the aircraft by differential setting of the pitches of the two propellers.

Another object of my invention is the provision of the engine between pilot and ground in vertical flight, giving added safety and a low center of gravity when the aircraft is on the ground.

Another object of my invention is the provision of unobscured, horizontal flight, forward vision by the pilot, unobscured by the wide, slowly-rotating blades required for hovering flight.

Another object of my invention is the provision of easy transition of the aircraft from low-speed, horizontal flight to the nose-down, vertical position required for hovering descent.

Further objects and advantages of my invention will appear in the following specification and accompanying drawings.

Figure 4:
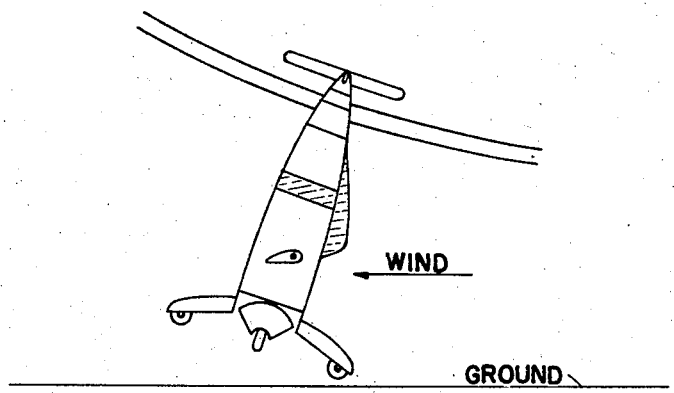
Figure 3:
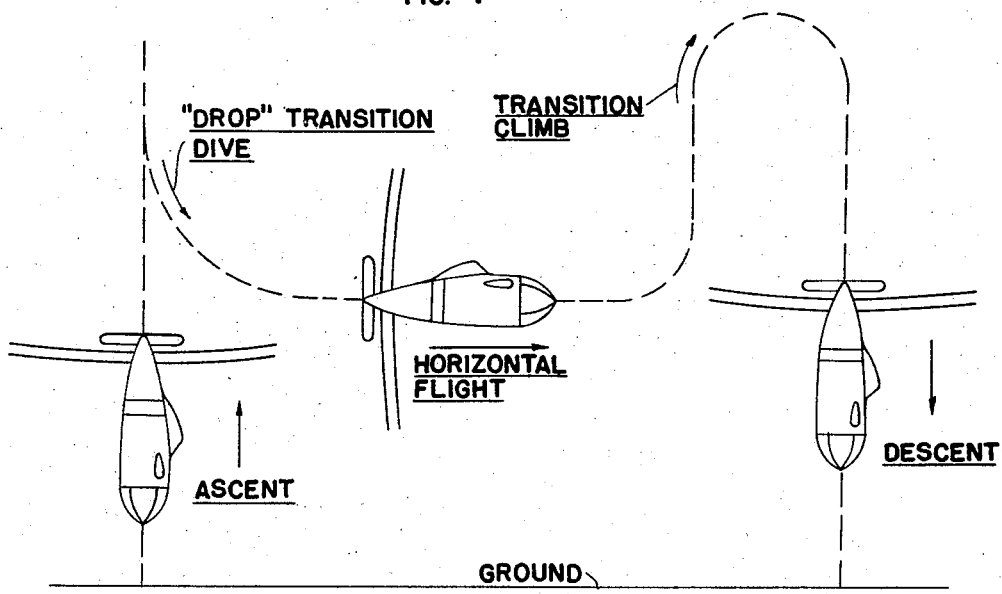
Figure 5:
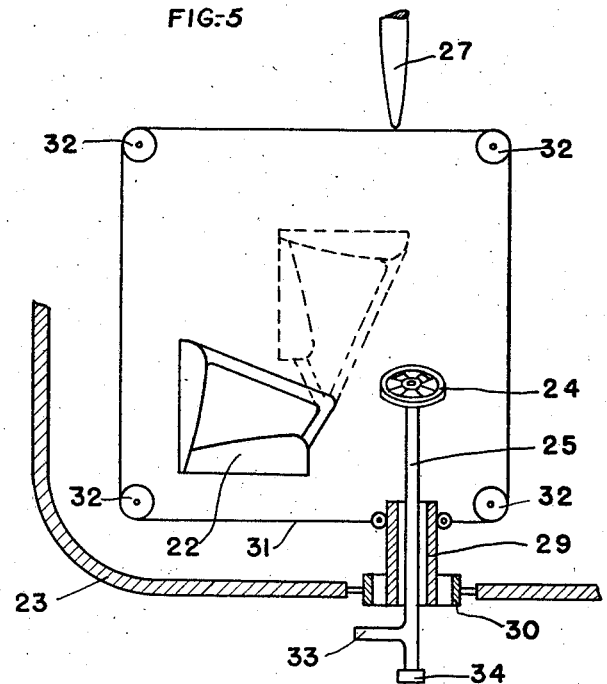
Figure 9:
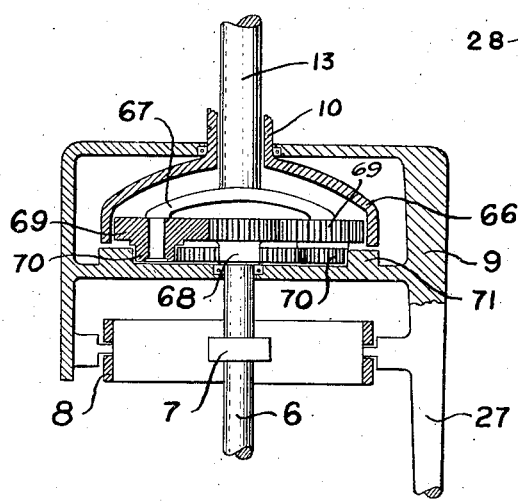
Figure 7:
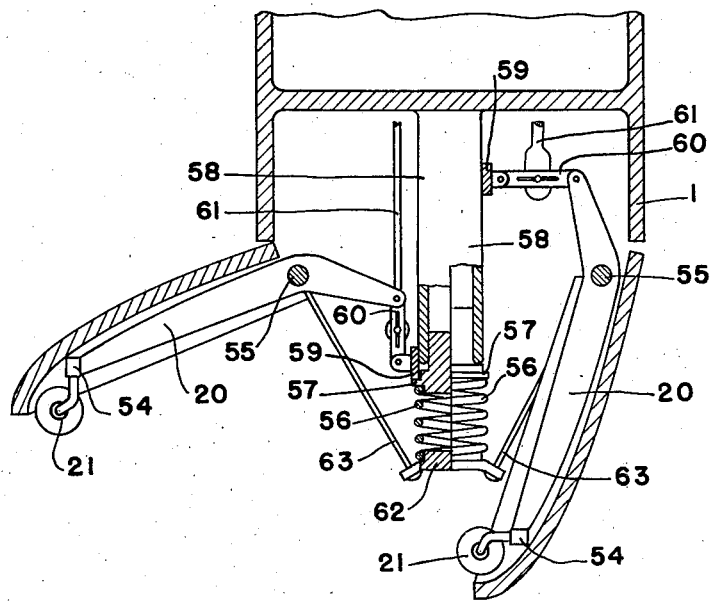
Figure 8:
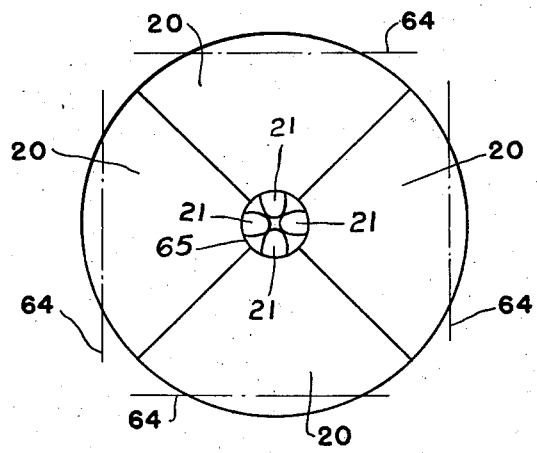
Figure 10:
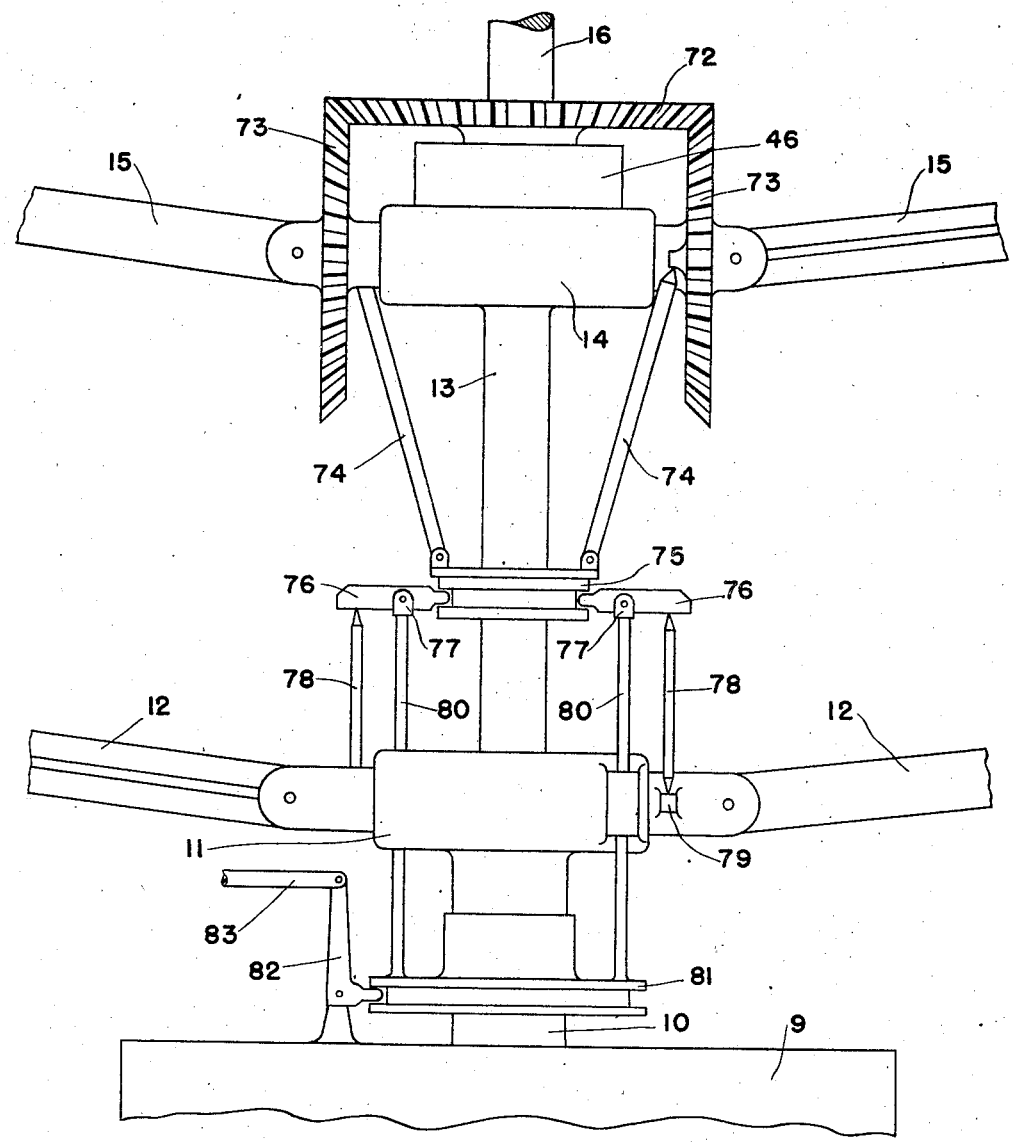

As an example of the construction of an aircraft embodying my invention, reference is made to the accompanying drawings, in which Figure 1 represents, in part, a sectional view along the center line of the aircraft, Figure 2 represents a plan view of the tail surfaces of the aircraft, Figure 3 the manner of vertical take-off, horizontal flight, and vertical descent, Figure 4 represents, diagrammatically, how the aircraft wings are permitted to trail in landing against a wind, Figure 5 details of the aircraft controls, Figure 6 the governor control of the mean propeller pitch, Figure 7 the aircraft landing gear in extended and retracted positions, Figure 8 a plan view of the forward end of the aircraft in horizontal flight, Figure 9 a reduction gear driving the propellers, and Figure 10 a method of propeller blade angle control.

Referring now specifically to Figure 1, I represents the body of the aircraft, 2 a wing of the aircraft, 3 the tail surfaces of the aircraft, 4 the engine, 5 an over-running clutch, 6 an engine extension shaft, 7 a constant velocity ratio universal joint, 8 a gimbal ring, 9 a propeller reduction gear, 10 an inboard propeller drive shaft, 11 an inboard propeller hub, 12 inboard propeller blades, preferably hinged, 13 an outboard propeller drive shaft, 14 an outboard propeller hub, 15 outboard propeller blades, preferably hinged, 16 an extension of the outboard propeller shaft, 17 the hub of the tail surfaces, 18 the outboard propeller spinner, 19 the inboard propeller spinner, 20 landing gear cantilevers, 21 landing gear wheels, 22 pivoted pilot seat, 23 pilot compartment floor, 24 control wheel or principal flight control, 25 the control wheel column, 26 a transparent cockpit enclosure, 27 propeller and tail system tilt control rod, and 28 a tubular wing spar. In some instances, the propeller system may operate at a sufficiently high mean blade angle in level flight to cause the rotating blades to function as tail surfaces, making actual tail surfaces 3, and hub 17, unnecessary.

Figure 2, as already stated, represents a plan view of the tail surfaces of the aircraft, in which 3 represents the tail surfaces and 17 the hub of the tail surfaces.

Referring now particularly to Figure 5, 24 is a control wheel or principal flight control, 25 the control wheel column, 29 the control wheel column guide, 30 a gimbal ring, 23 the cockpit floor, 22 the pivoted pilot seat, 31 a control cable, 32 control cable pulleys, 27 propeller and tail system tilt control rod, 33 a control wheel rotation take-off horn, 34 universal joints, 35 a push rod, 36 a wing control horn, 2 a wing, and 28 a tubular wing spar.

Referring now particularly to Figure 6, 37 represents an adjustable governor, driven by the propeller system, 38 a battery, one terminal of which is attached to ground 39, 40 the governor contacts, 41 an underspeed contact, 42 an overspeed contact, 43 a three-pole, double-throw transition switch, 44 a level-flight circuit, double-pole, double-throw, mean blade angle-controlled, snap switch, 45 a hovering-flight circuit, double-pole, double-throw, mean blade angle-controlled, snap switch, 46 a reversible, mean pitch change motor, 47 a pitch-change motor circuit ground return, 48, 49 level flight circuit electric leads, 50, 51 hovering flight circuit electric leads, 52 the increasing-pitch electric lead, and 53 the decreasing-pitch electric lead.

Referring now specifically to Figure 7, 1 represents the aircraft body, 20 landing gear cantilevers, 21 landing gear wheels, 54 a wheel castering joint, 55 cantilever pivot pins, 56 landing gear shock-absorbing spring, 57 a plunger, 58 a guide tube, 59 a collar, 60 a link, 61 a retracting rod, 62 a spring support, and 63 spring support tie rods.

Referring now specifically to Figure 8, 64 represent the axes of pins 55 of Figure 7, 20 the cantilever arms, shown also in Figures 1 and 7, 21 landing gear wheels, also shown in Figures 1 and 7, and 65 an aperture formed at the aircraft nose by the retracted landing gear.

Referring now specifically to Figure 9, which represents the propeller reduction gear shown by 9 of Figure 1, 6 represents the engine extension shaft, 7 a constant velocity ratio universal joint, 8 a gimbal ring, 27 the propeller and tail system tilt control rod, 10 the inboard propeller shaft, 13 the outboard propeller shaft, 66 a ring gear driving the inboard propeller shaft, 67 a spider driving the outboard propeller shaft, 68 a power input pinion, 69 spider pinions carrying the smaller, integral pinions 70, which mesh with fixed ring gear 71.

Referring now specifically to Figure 10, 9 is a propeller reduction gear, 10 an inboard propeller drive shaft, 11 an inboard propeller hub, 13 an outboard propeller drive shaft, 14 an outboard propeller hub, 16 an extension of the outboard propeller shaft, 46 an annular, reversible, mean pitch change motor, driving the master bevel gear 72, engaging bevel gears 73, setting the pitch of the outboard propeller blades 15 and actuating rods 74 to axially position grooved ring 75, rocking follower links 76 about pivots 77 to position rods 78 and thus, by means of control horns 79, set the pitch of inboard propeller blades 12. Push rod 83 is positioned by the control wheel rotation take-off horn 33 of Figure 5, to set bell crank 82, positioning ring 81, rods 80, and thus pivots 77, thereby setting up a difference in pitch between the inboard and outboard propellers.

To illustrate the operation of my improved aircraft, assuming that the aircraft is resting on its landing gear on the ground in a vertical position, as shown in Figure 1, with the landing gear extended, the pilot opens wider the engine throttle, until the rearward thrust of the propellers is sufficient to raise the aircraft from the ground. The aircraft is maintained in a vertical position by the pilot, by tilting the propeller system by laterally moving principal flight control 24 in a plane perpendicular to the aircraft body axis. By rotation of principal control 24, the pilot sets in a difference in blade angle between the two propellers, to cause control moments about the longitudinal axis of the aircraft. In this, as in the other operating conditions, the pilot selects the speed at which he wishes the propeller system to operate, by setting governor 37 of Figure 6.

During the ascent, the landing gear is retracted to form a streamlined nose to the aircraft, as is more fully illustrated in Figure 8. When a sufficient altitude has been reached to permit a safe transition dive, the pilot causes his propeller system to change from the hovering operation angle range to normal flight operation angle range by throwing switch 43 of Figure 6 from the hovering to the normal flight position. A rapid dive will immediately ensue. During the initial stages of the dive, the pilot locks the propeller and tail system tilt control rod 27 by any suitable means. By axial movement of principal control 24, the wings 2 are set at some positive, lifting angle of attack, causing the aircraft, when sufficient speed has been reached, to pull out of the dive into normal, level flight.

In level flight, the angle of attack of the wings 2 continues to be controlled by axial motion of principal control 24. Lateral control, in both dive and ensuing level flight, is obtained by impressing moments about the longitudinal axis of the body of the aircraft in the same manner as in hovering flight, by rotating principal control 24. The direction in which wheel 24 is turned will be the reverse, however, of that required for hovering.

The pilot's seat is so pivoted that the pilot may remain in an upright position during both vertical and horizontal travel of the aircraft.

Upon reaching destination, the pilot closes the throttle and noses the aircraft up into a climb, to decelerate the aircraft. When the speed has dropped to a sufficiently low value, the pilot causes his propeller system to change from the normal flight angle operation range back to the hovering operation angle range by throwing switch 43 of Figure 6 from the flight position to the hovering position. The aircraft will automatically nose down into the hovering flight position as the propeller system reaches the hovering blade angle range. The pilot may regulate his speed of descent by the throttle setting of the engine. In still air, landing is merely the reverse of the take-off procedure, care being taken that the ground contact velocity is not excessive. These operations are shown, in diagrammatic form, in Figure 3. In landing against the wind, the pilot will compensate for his ground velocity by maintaining the aircraft in a slightly inclined position, allowing its crosswise drift to compensate for the wind. In landing against very high winds, the pilot will let wings 2 pivot freely on tubular spar 28, so that the drag of the wings, relative to the cross wind, will be a minimum. All this is shown, in diagrammatic form, in Figure 4.

Figure 5 shows details of the aircraft controls. Movement of principal control 24 in a plane perpendicular to the axis of the aircraft body tilts control column 26 and thereby guide 29 about the center of gimbal ring 30. This tilt of guide 29 actuates cable 31, moving over pulleys 32, to produce a corresponding tilt of propeller system tilt control rod 27. Cable 31 and pulleys 32 are duplicated in a plane at right angles to that shown in Figure 5, to effect tilt control in any desired direction.

Axial motion of wheel 24 acts to move push rod 35, changing the angle of attack of wings 2 by movement of control horn 36. The rotation of control wheel 24 moves horn 33 to effect a mean blade angle difference between the two propellers by moving push rod 83 of Figure 10, as was previously described.

Figure 6 shows the governor control of the mean pitch of the propeller system, to give the particular constant speed of rotation desired by the pilot. Governor 37 is adjustable to cause current to flow to contact 41 when the propellers are rotating at less than the desired speed, and to contact 42 when turning at more than the desired speed. In hovering flight, switch 43 connects the governor contacts with leads 51 and 50, running to mean blade angle controlled switch 45. In normal airplane flight, switch 43 connects the governor contacts to leads 48 and 49, running to mean blade angle controlled switch 44.

Assuming the aircraft in normal airplane type flight, with switch 43 connecting to leads 48 and 49, and propeller blades operating in the normal flight angle range, switch 44 is connecting lead 48 with lead 53, and lead 49 to lead 52. When the propeller system is under speed, current will flow from contact 41, through leads 48 and 53, to pitch change motor 46, and rotate motor 46 to decrease, as shown in Figure 10, the mean pitch of the propellers. When over speed, current flows from contact 42, via leads 49 and 52, to operate motor 46 in the opposite direction, to increase the mean pitch of the propeller blades.

In hovering flight, the mean pitch of the propeller blades must be changed in the opposite direction to that required in normal airplane type flight. Accordingly, when the propeller system is under speed, current from contact 41 will flow via leads 50 and 52 to increase the pitch of the propeller blades. When the propeller system is turning over speed, current from contact 42 passes via leads 51 and 53, to decrease the mean pitch of the propellers.

Switches 44 and 45 are thrown by mean blade angle controlled cams, not shown, to leads 48 and 49, and to the single contact, respectively, when the mean blade angle of the propeller system is in the level flight range. When the mean blade angle is in the hovering range, switch 44 is connected to its single contact and switch 45 to leads 50 and 51. These mean blade angle controlled connections cause the mean blade angle to change to and remain in the operating blade angle range called for by the position of switch 43.

Although a sufficiently skilled pilot might be able to select manually the proper mean propeller pitch, it is preferred that he be relieved of the task by a system like the above.

In Figure 7, right half thereof, retracting rod 61 is moved downward to extend cantilever arms 20 by causing collar 59 and connecting link 60 to be moved downward, until collar 59 comes in contact with the external shoulder of plunger 57. The landing gear is then approximately in the position shown in the left half of Figure 7. The landing forces entering via wheel 21 cause cantilever 20 to pivot about pin 55, causing link 60 to move collar 59 and plunger 57 downward, compressing spring 56, to absorb the shock of landing.

In Figure 8, which represents the landing gear in a retracted position, there is shown how cantilever arms 20 may be faired, forming a streamlined nose of the aircraft and causing opening 65 to be formed, suitable for the intake of cooling air.

In Figure 9, which represents the reduction gear driving the propellers, it will be noted that this gear drive acts to rotate propeller shafts 10 and 13 in opposite directions at a fixed velocity ratio and incorporates a speed reduction relative to the speed of shaft 6.

Figure 10, as previously described, shows how the mean propeller pitch is controlled by motor 46 and the propeller pitch difference manually controlled by principal flight control 24 of Figure 5, by means of horn 33, acting through rod 83.

I do not limit myself to the exact construction shown in the drawings and specification hereof, which are given by way of illustration and not of limitation, but I may substitute known equivalents for the various means shown in the preferred embodiment of my invention, without departing from the spirit of my invention.

What I claim is:

1. An aircraft capable of ascending and descending vertically and flying horizontally, comprising in combination, a body, a propeller system at one end of the body adapted to support the craft in hovering flight by propeller means only, means for reversing the thrust of the propeller system with respect to said body for horizontal flight by pusher propulsion.

2. An aircraft capable of ascending and descending vertically and flying horizontally, comprising in combination, a body, a propeller system at one end of the body adapted to effect take-off and ascent of the body tail first and to support the craft in hovering flight by propeller means only, means for reversing the propeller system with respect to the said body for horizontal flight with tail trailing, and means assisting the propeller system when so reversed for supporting the craft in horizontal flight.

3. An aircraft capable of ascending and descending vertically and flying horizontally, the combination comprising, a body, a reversible pitch propeller system mounted at one end of said body for propelling the aircraft in opposite directions, landing gear retractable to form a stream-line extension at the opposite end of said body, and having an aperture at the outboard end of said extension, means for limiting the pitch range of the propeller system for take-off of the aircraft while in the vertical position on its landing gear and in trailing relation, means for reversing the pitch of the propeller system and for limiting its range for horizontal flight with the landing gear retracted and operating as an air piercing cone, and pivoted wing means for assisting transition from vertical flight to horizontal flight.

4. An aircraft comprising in combination, a body, a propeller system mounted at one end of the body, means universally articulating the propeller system with respect to the body, selective means for tilting the propeller system with respect to the body axis, tail surfaces outboard of the propeller system, and means for mounting the tail surfaces freely rotatable on a shaft of the propeller system.

5. An aircraft, the combination comprising, a body, an engine driving a propeller system, means universally joining the propeller system to the engine, means adapted to tilt the propeller system in more than one plane through a small, acute angle range with respect to the axis of the body of the aircraft, means for reversing the thrust of said propeller system upon the body for selectively effecting positive and negative thrust operating conditions, means adapted to control the propeller system to give governed constant speed propeller operation, in both positive and negative thrust operating conditions, means for restricting the mean propeller blade angle to the selected operating condition, and means for effecting the transition from either operating condition to the other operating condition at will.

6. An aircraft capable of ascending and descending vertically and of flying horizontally, including in combination, an elongated body, wing surfaces extending transverse of the body and means for tilting them with respect thereto, an engine in the body located in the region of the wing surfaces, a propeller system driven by the engine and including two coaxial controllable pitch propellers rotatable in opposite directions and universally mounted at one end of the body, a retractable landing gear mounted on the opposite end of the body for supporting the body in a vertical position and adapted to be closed to form an air piercing cone, means adapted to tilt said propeller system in more than one plane through a small acute angle range with respect to the longitudinal axis of the body, means for reversing the pitch of the propeller system at will to reverse the propelling thrust thereof with respect to said body, whereby the propeller system is translated from a tractor propeller system for take-off and landing, to a pusher propeller system for normal horizontal flight and vice versa, and means for controlling the pitch of the blades of the propeller system during both thrust conditions of operation.

7. The method of launching, from a supporting surface, an aircraft having fixed airfoil means for sustaining the aircraft along a flight path in a substantially horizontal attitude and rotary airfoil means for sustaining the aircraft along a flight path in a substantially vertical attitude and for propelling the aircraft along a flight path in either of said attitudes, including the steps of positioning the aircraft in a nose-down attitude upon the supporting surface; accelerating the aircraft by means of the rotary airfoil means from a state of rest upon the supporting surface to a state of motion in which the aircraft moves upward tail-first to a desired altitude; decelerating the aircraft by means of the rotary airfoil means to a state of rest; accelerating the aircraft by means of the rotary airfoil means to a state of motion in which the aircraft moves downward nose-first in a substantially vertical attitude until it has reached a velocity at which the fixed airfoil means is capable of sustaining the aircraft in a substantially horizontal attitude; and, then guiding the aircraft from the flight path along which it is descending to a flight path along which the aircraft proceeds in a substantially horizontal attitude at a velocity at which the aircraft is sustained by the fixed airfoil means.

8. The method of landing, upon a supporting surface, an aircraft having fixed airfoil means for sustaining the aircraft along a flight path in a substantially horizontal attitude and rotary airfoil means for sustaining the aircraft along a flight path in a substantially vertical attitude and for propelling the aircraft in flight in both of said attitudes including the steps of guiding the aircraft downwardly nose-first from a flight path along which the aircraft is proceeding in a substantially horizontal attitude at a velocity at which it is sustained by the fixed airfoil means to a flight path along which the aircraft descends in a substantially vertical attitude at a reduced velocity at which it is sustained by the rotary airfoil means until it reaches an altitude proximate to the supporting surface; and, then rapidly decelerating the aircraft by means of the rotary airfoil means over the remaining distance to a state of rest in a nose-down attitude upon the supporting surface.

JOSEPH STUART, III.